US011070769B1

(12) United States Patent
Nakagawa

(10) Patent No.: US 11,070,769 B1
(45) Date of Patent: Jul. 20, 2021

(54) COLLABORATIVE SECURITY CAMERA SYSTEM AND METHOD FOR USING

(71) Applicant: Toyota Motor Engineering & Manufacturing North America, Inc., Plano, TX (US)

(72) Inventor: Masashi Nakagawa, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/012,511

(22) Filed: Sep. 4, 2020

(51) Int. Cl.
*H04N 7/18* (2006.01)
*G06K 9/00* (2006.01)
*G06K 9/62* (2006.01)

(52) U.S. Cl.
CPC ......... *H04N 7/181* (2013.01); *G06K 9/00335* (2013.01); *G06K 9/00771* (2013.01); *G06K 9/00791* (2013.01); *G06K 9/6284* (2013.01); *H04N 7/188* (2013.01)

(58) Field of Classification Search
CPC .... H04N 7/181; H04N 7/188; G06K 9/00335; G06K 9/00771; G06K 9/00791; G06K 9/6284
See application file for complete search history.

(56) References Cited

U.S. PATENT DOCUMENTS

| 8,896,432 | B2 | 11/2014 | Kang et al. | |
|---|---|---|---|---|
| 2009/0247132 | A1* | 10/2009 | Sumcad | H04W 4/029 455/412.1 |
| 2014/0071037 | A1* | 3/2014 | Cohen | G06K 9/00355 345/156 |
| 2018/0267547 | A1 | 9/2018 | Michalakis et al. | |
| 2020/0126404 | A1 | 4/2020 | Edwards | |
| 2020/0216026 | A1* | 7/2020 | Price | G08B 13/19602 |

FOREIGN PATENT DOCUMENTS

| CN | 110239488 A | 9/2019 | |
|---|---|---|---|
| DE | 102010002092 A1 * | 12/2010 | G01C 21/26 |
| JP | 2017142685 A | 8/2017 | |
| WO | 2013170882 A1 | 11/2013 | |
| WO | WO-2013170882 A1 * | 11/2013 | H04L 67/12 |

* cited by examiner

*Primary Examiner* — Peet Dhillon
(74) *Attorney, Agent, or Firm* — Dinsmore & Shohl LLP

(57) ABSTRACT

A collaborative security camera system includes a primary vehicle including a sensor to obtain data related to an object, and a first controller. The first controller classifies the object as suspicious activity or non-suspicious activity based on the obtained object data, determines a moving path of the object in response to the object being classified as suspicious activity, and broadcasts a signal including the moving path of the object if the object is classified as suspicious activity. The collaborative security camera system also includes a secondary vehicle including a sensor configured to obtain image data related to the object, and a second controller. The second controller receives the broadcasted signal, determines if the secondary vehicle is within the moving path, and captures image data of the object if the secondary vehicle is proximate the moving path.

18 Claims, 3 Drawing Sheets

COLLABORATIVE SECURITY CAMERA SYSTEM AND METHOD FOR USING

TECHNICAL FIELD

The present specification generally relates to systems and methods for capturing an image of an object and, more specifically, systems and methods capturing an image of an object by multiple vehicles positioned along a moving path of the object.

BACKGROUND

Conventional vehicles include imaging devices for capturing an image of an object such as, for example, a person or another vehicle in instances in which the vehicle determines that suspicious activity may be occurring. However, the vehicle may be unable to continue capturing images of the object when the object moves out of range of the vehicle. Thus, the images captured of the object is limited to only those captured by a single vehicle. However, the suspicious activity may still be occurring when out of range of the vehicle and it may be necessary to continue to capture images of such activity.

Accordingly, a need exists for improved security camera systems and methods that permit an initial vehicle to send a signal to surrounding vehicles so that the surrounding vehicles may continue capturing images of an object involved in suspicious activity.

SUMMARY

In one embodiment, a collaborative security camera system includes a primary vehicle including one or more sensors configured to obtain data related to an object, and a first controller. The first controller is configured to classify the object as suspicious activity or non-suspicious activity based on the obtained object data related to the object, determine a moving path of the object based on the obtained object data related to the object in response to the object being classified as suspicious activity, and broadcast a signal including the moving path of the object in response to the object being classified as suspicious activity. The collaborative security camera systems also include a secondary vehicle including one or more sensors configured to obtain image data related to the object, and a second controller. The second controller is configured to receive the broadcasted signal, determine if the secondary vehicle is within the moving path of the object, and capture image data of the object in response to a determination that the secondary vehicle is proximate the moving path of the object.

In another embodiment, a method for capturing object data of an object includes classifying an object as suspicious activity based on obtained object data related to the object by a first controller of a primary vehicle, determining a moving path of the object based on the obtained object data related to the object, broadcasting a signal from the first controller including the moving path of the object, receiving the broadcasted signal at a second controller of a secondary vehicle, determining if the secondary vehicle is within the moving path of the object, and capturing image data of the object by the second controller in response to a determination that the secondary vehicle is proximate the moving path of the object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
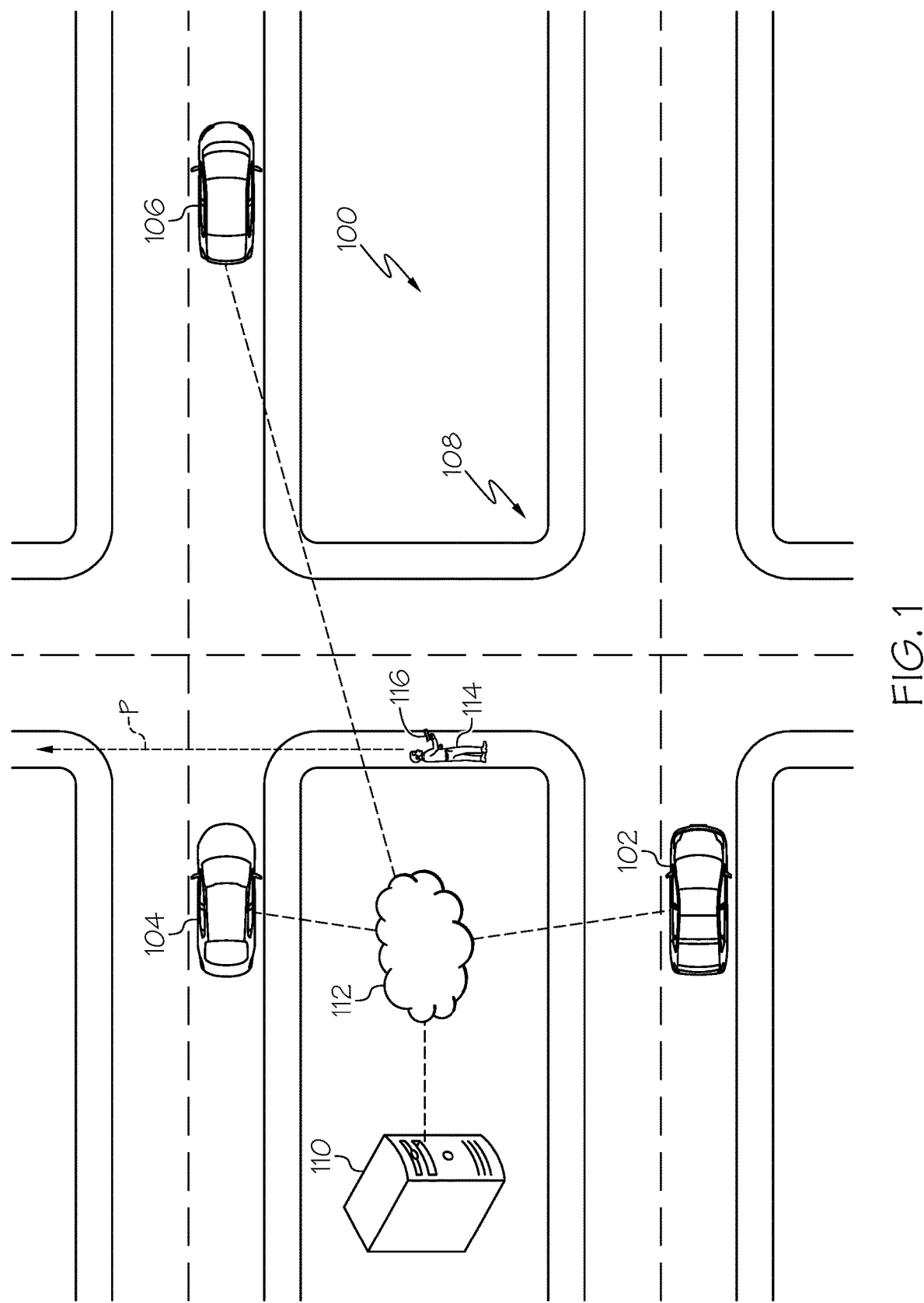
FIG. 1 schematically depicts a collaborative security camera system including a primary vehicle, at least one secondary vehicle, and a server on a roadway, according to one or more embodiments shown and described herein.

Embodiments described herein are directed to collaborative security camera systems and methods for capturing data of an object exhibiting suspicious behavior by multiple vehicles positioned proximate a moving path of the object.

The collaborative security camera systems include a primary vehicle including one or more sensors configured to obtain data related to an object, and a first controller. The first controller is configured to classify the object as suspicious activity or non-suspicious activity based on the obtained object data related to the object, determine a moving path of the object based on the obtained object data related to the object in response to the object being classified as suspicious activity, and broadcast a signal including the moving path of the object in response to the object being classified as suspicious activity. The collaborative security camera systems also include a secondary vehicle including one or more sensors configured to obtain image data related to the object, and a second controller. The second controller is configured to receive the broadcasted signal, determine if the secondary vehicle is within the moving path of the object, and capture image data of the object in response to a determination that the secondary vehicle is proximate the moving path of the object.

The collaborative security camera systems and methods permit data of the object to be captured as the object moves along a moving path that may be out of range of the primary vehicle. Thus, the primary vehicle sends a signal to one or more secondary vehicles to continue to capture data of the object such that images of the object may be captured over an extended period of time as opposed to the images captured by the primary vehicle alone.

Various embodiments of the systems and methods and the operation of the systems are described in more detail herein. Whenever possible, the same reference numerals will be used throughout the drawings to refer to the same or like parts.

Referring now to FIG. 1, a collaborative security camera system 100 is shown generally including a primary vehicle 102 and a plurality of secondary vehicles 104, 106 driving on a roadway 108. While FIG. 1 illustrates two secondary vehicles 104, 106, it should be appreciated that the collaborative security camera system 100 may include more than or less than two secondary vehicles 104, 106. The primary vehicle 102 and the secondary vehicles 104, 106 may communicate with a server 110 of the collaborative security camera system 100 via a network 112. The server 110 may be a remote server such as a cloud server. In some embodiments, the server 110 may be a local server including, but not limited to, a roadside unit, an edge server, and the like.

Each of the primary vehicle 102 and the secondary vehicles 104, 106 may be a vehicle including an automobile or any other passenger or non-passenger vehicle such as, for example, a terrestrial, aquatic, and/or airborne vehicle. In some embodiment, one or more of the primary vehicle 102 and the secondary vehicles 104, 106 may be an unmanned aerial vehicle (UAV), commonly known as a drone.

The server 110 may communicate with vehicles in an area covered by the server 110. The server 110 may communicate with other servers that cover different areas. The server 110 may communicate with a remote server and transmit information collected by the server 110 to the remote server.

In embodiments, each of the primary vehicle 102 and the secondary vehicles 104, 106 may include a neural network for identifying objects and suspicious activity. Additionally, the neural network may include a machine learning algorithm for identifying objects and suspicious activity. As discussed in more detail herein, the neural network of the primary vehicle 102 and the secondary vehicles 104, 106 may be adjusted by user operation to better identify objects and suspicious activity in accordance with specific user preferences.

As shown in FIG. 1, an object 114 is located on the roadway 108. The object 114 is illustrated as a person, but it should be appreciated that the object 114 may be any suitable object such as, for example, a vehicle, an animal, or the like. As shown, the object 114 is moving along a moving path P along the roadway 108 away from the primary vehicle 102 and toward at least one of the secondary vehicles 104, 106. As described in more detail herein, the primary vehicle 102 is configured to determine whether the object 114 is exhibiting suspicious behavior using the neural network. When the object 114 is a person, the primary vehicle 102 may determine the object 114 constitutes suspicious activity when, for example, the person is holding a weapon, the person is confronting or fighting another person, the person is screaming or yelling, or the like. When the object 114 is a vehicle, the primary vehicle 102 may determine the object 114 constitutes suspicious activity when the vehicle is using its horn for a period of time exceeding a predetermined threshold, driving at a speed exceeding a predetermined threshold, driving erratically, or the like. As shown, the object 114 is a person holding a weapon 116, such as a gun, and, thus, constitutes suspicious activity. In instances in which the object 114 does not constitute suspicious activity, the object 114 is classified as non-suspicious activity.

Figure 2:
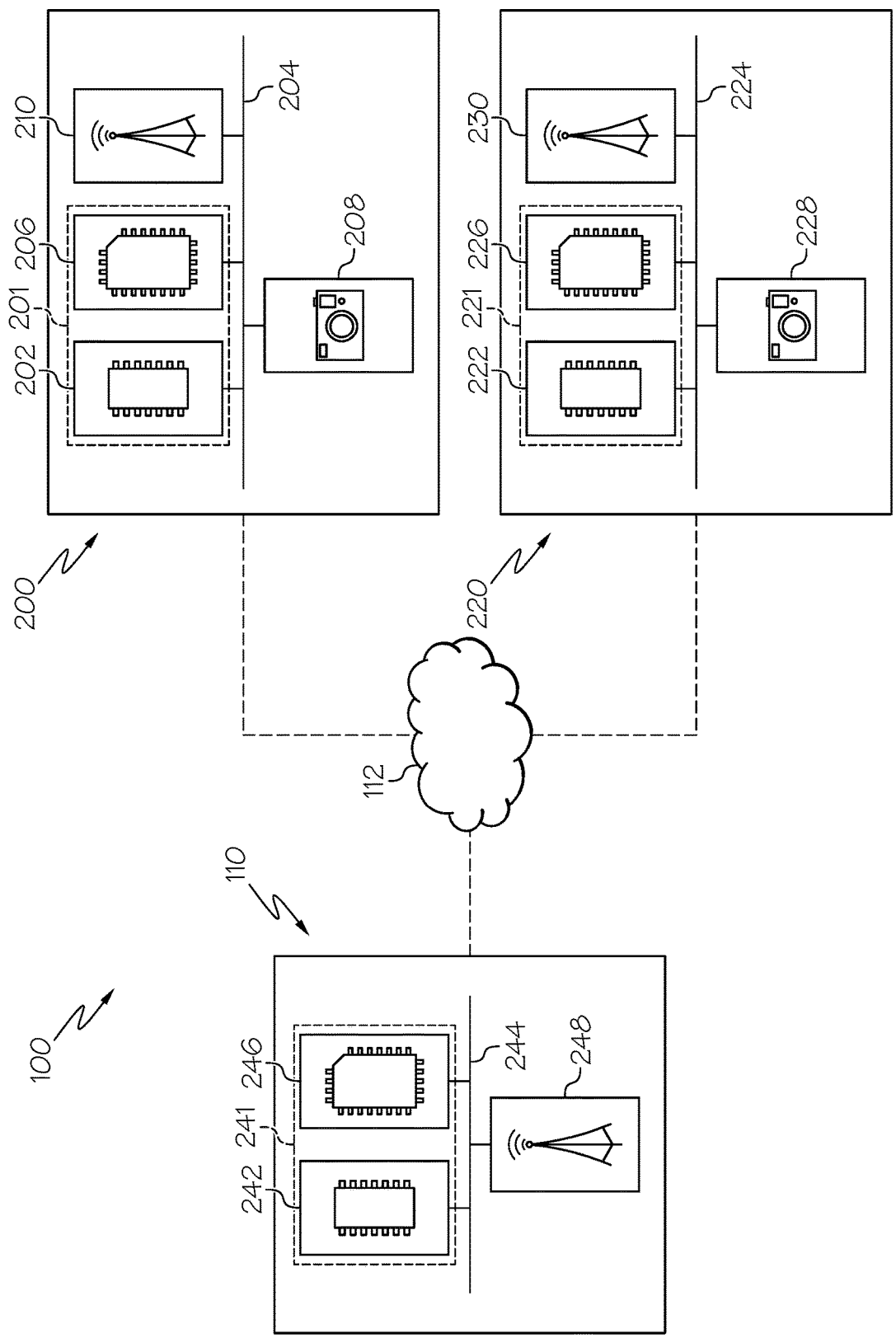
FIG. 2 schematically depicts components of the collaborative security camera system, according to one or more embodiments shown and described herein.

FIG. 2 depicts a schematic diagram of the collaborative security camera system 100 including a primary vehicle system 200, a secondary vehicle system 220, the server 110, and the network 112, according to one or more embodiments shown and described herein. It is noted that, while the primary vehicle system 200 and the secondary vehicle system 220 are depicted in isolation, each of the primary vehicle system 200 and the secondary vehicle system 220 may be included within a vehicle, for example, within the primary vehicle 102 and the secondary vehicle 104 of FIG. 1, respectively. Further, it should be appreciated that while only one secondary vehicle system 220 of the secondary vehicle 104 is illustrated, the collaborative security camera system 100 may include any number of secondary vehicle systems based on the number of secondary vehicles present.

The primary vehicle system 200 includes a first controller 201 including one or more processors 202 and one or more memory modules 206. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the primary vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the primary vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 206 may include one or more neural networks. The one or more memory modules 206 may include machine readable instructions that, when executed by the one or more processors 202, cause the primary vehicle system 200 to receive object data from one or more sensors of an object, such as the object 114 of FIG. 1, and process the object data with the neural network to classify the object as either suspicious activity or non-suspicious activity.

Referring still to FIG. 2, the primary vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. The image data may include image data of the object 114 in FIG. 1. The image data may include time series images for determining the moving path P of the object 114 and, in some embodiments, a speed of the object 114. In some embodiments, the one or more sensors 208 may also be configured to capture sound data and provide the sound data to the one or more processors 202 or another component communicatively coupled to the communication path 204.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein. Ranging sensors like radar may be used to obtain a rough depth and speed information of an object. The primary vehicle system 200 may capture object data an object, such as the object 114 in FIG. 1 using one or more imaging sensors. The one or more processors 202 may process the captured object data, including at least one of image data and sound data, with the neural network to identify the object 114 and classify the object 114 as either suspicious activity or non-suspicious activity.

In operation, the one or more sensors 208 capture object data and communicate the object data to the one or more processors 202 and/or to other systems communicatively coupled to the communication path 204. The object data may be received by the one or more processors 202, which may process the object data using one or more processing algorithms. Any known or yet-to-be developed video, image, and audio processing algorithms may be applied to the object data in order to identify the object as either suspicious activity or non-suspicious activity. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

Still referring to FIG. 2, the primary vehicle system 200 comprises network interface hardware 210 for communicatively coupling the primary vehicle system 200 to the secondary vehicle system 220 and/or the server 110. The network interface hardware 210 can be communicatively coupled to the communication path 204 and can be any device capable of transmitting and/or receiving data via the network 112. Accordingly, the network interface hardware 210 can include a communication transceiver for sending and/or receiving any wired or wireless communication. For example, the network interface hardware 210 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 210 includes hardware configured to operate in accordance with the Bluetooth® wireless communication protocol. The network interface hardware 210 of the primary vehicle system 200 may transmit its data to the secondary vehicle system 220 and/or the server 110. For example, the network interface hardware 210 of the primary vehicle system 200 may transmit the captured object data, including image data and/or sound data identifying the moving path P of the object 114 generated by the primary vehicle system 200 to the secondary vehicle system 220 and/or the server 110.

The primary vehicle system 200 may connect with one or more external vehicle systems (e.g., the secondary vehicle system of the secondary vehicles 104, 106) and/or external processing devices (e.g., the server 110) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 112), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the primary vehicle system 200 may be communicatively coupled to the server 110 by the network 112. In one embodiment, the network 112 may include one or more computer networks (e.g., a personal area network, a local area network, or a wide area network), cellular networks, satellite networks and/or a global positioning system and combinations thereof. Accordingly, the primary vehicle system 200 can be communicatively coupled to the network 112 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the secondary vehicle system 220 includes a second controller 221 including one or more processors 222 and one or more memory modules 226, one or more sensors 228, network interface hardware 230, and a communication path 224 communicatively connected to the other components of the secondary vehicle system 220. The components of the secondary vehicle system 220 may be structurally similar to and have similar functions as the corresponding components of the primary vehicle system 200 (e.g., the one or more processors 222 corresponds to the one or more processors 202, the one or more memory modules 226 corresponds to the one or more memory modules 206, the one or more sensors 228 corresponds to the one or more sensors 208, the network interface hardware 230 corresponds to the network interface hardware 210, and the communication path 224 corresponds to the communication path 204). The one or more memory modules 226 may include one or more neural networks.

Still referring to FIG. 2, the server 110 includes a controller 241 including one or more processors 242 and one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204 in some embodiments.

Figure 3:
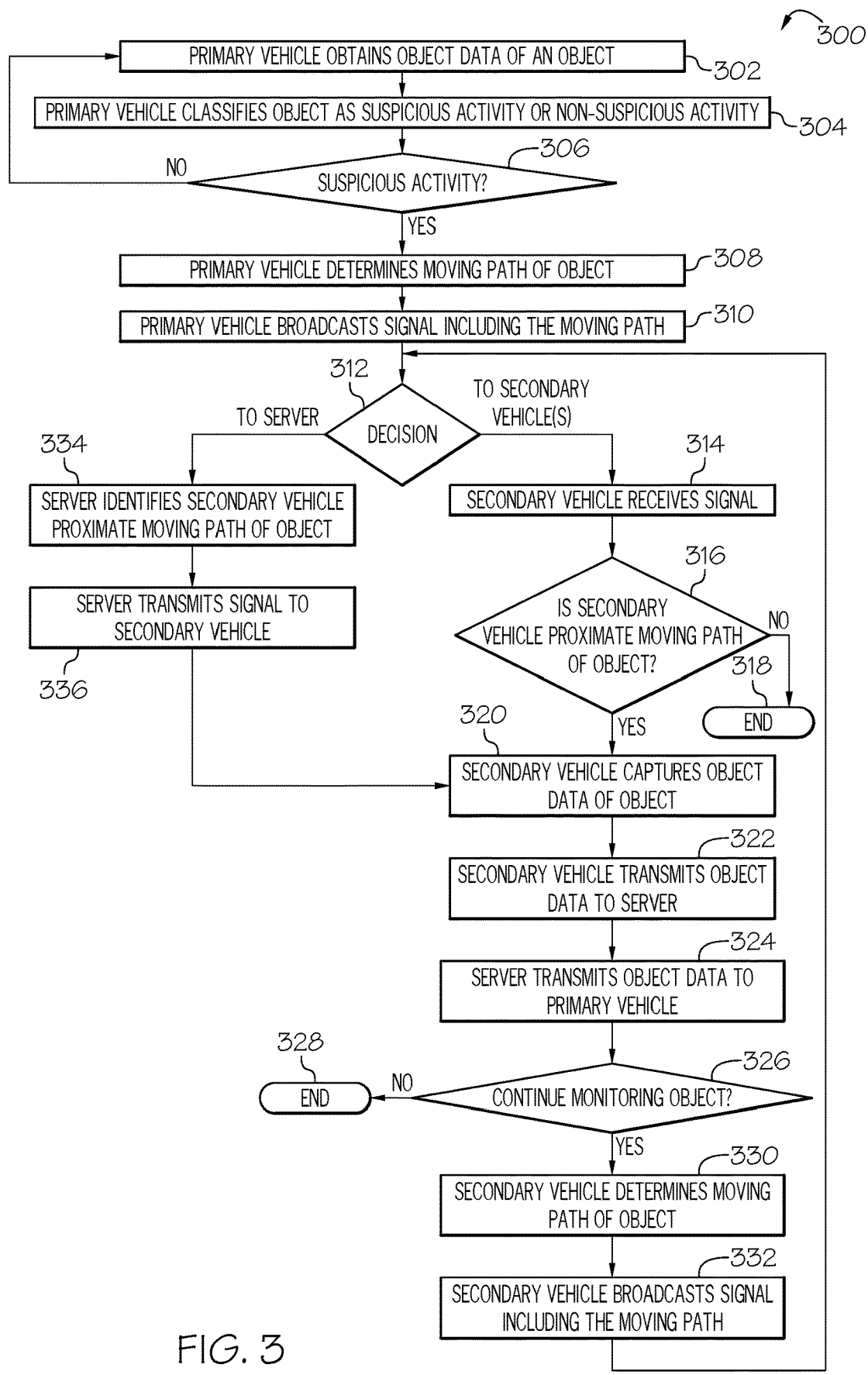
FIG. 3 schematically depicts a flowchart of a method for capturing an image of an object utilizing the collaborative security camera system, according to one or more embodiments shown and described herein.

FIG. 3 depicts a method 300 for capturing images of an object classified as suspicious activity, according to one or more embodiments shown and described herein. The method 300 is described herein with reference to FIGS. 1 and 2.

At step 302, the primary vehicle 102 identifies an object, e.g., the object 114, using the one or more sensors 208 and captures object data of the object 114. The object data may include at least one of image data of the object 114 and sound data of the object 114.

At step 304, the primary vehicle 102, particularly the first controller 201 of the primary vehicle 102, which includes the one or more processors 202 and the one or more memory modules 206, processes the object data and classifies the object 114 as either suspicious activity or non-suspicious activity using the neural network. As discussed herein, when the object 114 is a person, the object 114 may be classified as suspicious activity when, for example, it is determined that the person is holding a weapon, the person is confronting or fighting another person, the person is screaming or yelling, or the like. Alternatively, when the object 114 is a vehicle, it may be determined that the object 114 constitutes suspicious activity when, for example, the vehicle is using its horn for a period of time exceeding a predetermined threshold, driving at a speed exceeding a predetermined threshold, driving erratically, or the like. In the illustrative example illustrated in FIG. 1, the object 114 is a person holding a weapon 116, e.g., a gun, and, thus, the first controller 201 classifies the object 114 as suspicious activity.

After processing the object data captured by the primary vehicle 102, a determination is made at step 306 to proceed to step 308 in response to the first controller 201 identifying at least one aspect of the object data indicating suspicious activity, e.g., a person carrying a weapon, a vehicle speeding, etc. Alternatively, in response to the first controller 201 classifying the object 114 as non-suspicious activity, the method 300 returns to step 302 to capture object data of additional objects.

At step 308, in response to the object 114 being classified as suspicious activity, the first controller 201 further processes the object data of the object 114 captured by the one or more sensors 208 and determines the moving path P of the object 114. As used herein, a moving path refers to a predicted path in which an object will travel. The moving path P of the object 114 may be determined by comparing multiple images captured by the one or more sensors 208 of the primary vehicle 102 over a period of time. In some embodiments, the multiple images may be analyzed to determine both the moving path P and a speed of the object 114. In some embodiments, the moving path P of the object 114 may be determined by analyzing sound data included in the object data and captured by the primary vehicle 102. Particularly, the one or more sensors 208 of the primary vehicle 102 may be configured to capture sound data of the object 114 and the primary vehicle 102 may extrapolate movement of the object 114 relative to the primary vehicle 102 to determine the moving path P of the object 114. It should be appreciated that the object data captured by the one or more sensors 208 may include both image data and sound data to more accurately determine the moving path P of the object 114 as opposed to capturing only one of image data and sound data.

Upon classifying the object 114 as suspicious activity and determining the moving path P of the object 114, the primary vehicle 102 broadcasts a signal at step 310. The signal includes the object data, which includes the image data and/or the sound data, as well as the determined moving path P of the object 114. In some embodiments, the signal also includes the speed of the object 114, if determined by the primary vehicle 102.

A determination is made at step 312 as to whether the primary vehicle 102 should broadcast the signal generally to the secondary vehicles 104, 106 or transmit the signal directly to the server 110. In response to the determination being made at step 312 to broadcast the signal generally to the secondary vehicles 104, 106, the method 300 continues to step 314. When the signal is broadcasted to the secondary vehicles 104, 106, the signal may be broadcasted to the secondary vehicles 104, 106 directly or via the network 112.

At step 314, the secondary vehicles 104, 106 that are within a communication range of the primary vehicle 102 receive the signal. The communication range may be determined by the capabilities of the network interface hardware 210 of the primary vehicle 102 or may be a predetermined range such that only secondary vehicles within a specified radius of the primary vehicle 102 receive the signal. Thus, in some embodiments, the secondary vehicle 106 may be out of range to receive the signal directly from the primary vehicle 102. In other embodiments, both of the secondary vehicles 104, 106 will receive the signal from the primary vehicle 102. It should be appreciated that additional secondary vehicles other than the secondary vehicles 104, 106 illustrated in FIG. 1 may be present. However, these additional secondary vehicles may be out of range to receive the broadcasted signal from the primary vehicle 102.

Once the secondary vehicles 104, 106 receive the signal from the primary vehicle 102, each of the secondary vehicles 104, 106 processes the object data of the object 114 within the signal at step 316 to determine whether the secondary vehicles 104, 106 are located proximate and/or within the moving path P of the object 114. As used herein, the term proximate is referred to as being within predetermined range of the moving path P of the object 114 such that object data of the object 114 may be captured by the secondary vehicles 104, 106. As a non-limiting example, the secondary vehicle 106 may determine at step 316 that the secondary vehicle 106 is not proximate the moving path P of the object 114 such that the secondary vehicle 106 is not capable of capturing image data and/or sound data of the object 114. In this instance, the secondary vehicle 106 ignores the signal, takes no further action, and the process ends at step 318. In another non-limiting example, the secondary vehicle 104 may determine at step 316 that the secondary vehicle 104 is within proximity of the moving path P of the object 114 and proceed to step 320.

At step 320, the secondary vehicle 104, which is proximate the moving path P of the object 114, identifies the object 114 based on the object data received from the primary vehicle 102 and captures additional object data of the object 114 using the one or more sensors 228 of the secondary vehicle 104. The secondary vehicle 104 may capture object data of the object 114 in a similar manner as the primary vehicle 102 at step 302. As such, the object data of the object 114 captured by the secondary vehicle 104 may include at least one of image data and sound data.

At step 322, the secondary vehicle 104 transmits the object data captured by the secondary vehicle 104 to the server 110 via the network 112. At step 324, the server 110 receives the object data from the secondary vehicle 104, which includes image data and/or sound data of the object 114, and transmits the object data back to the primary vehicle 102. Thus, object data, including image data and/or sound data, may be captured of the object 114 by both the primary vehicle 102 and at least the secondary vehicle 104 and, thus, over a greater distance than would otherwise be captured by only the primary vehicle 102. As such, it should be appreciated that this allows for continued monitoring of the object 114 exhibiting suspicious activity. In instances in which more than one secondary vehicle, e.g., secondary vehicles 104, 106, are proximate the moving path P of the object 114, each secondary vehicle captures object data of the object 114, and each secondary vehicle transmits the object data to the server 110. The server 110 may combine or stich the object data from each secondary vehicle into a single video file and/or sound file to be transmitted to the primary vehicle 102. Thus, in some embodiments, the primary vehicle 102 may receive a single video file containing object data from a plurality of secondary vehicles to provide image data of the object 114 over a longer period of time as would be provided by only one secondary vehicle.

At step 326, the secondary vehicle 104 makes a determination as to whether monitoring of the object 114 should continue. The determination as to whether the object 114 should continue to be monitored may be made by processing the object data captured by the secondary vehicle 104 to determine if the object 114 still constitutes suspicious activity. This may be determined by the second controller 221 using the neural network. If it is determined that the object 114 is no longer exhibiting the suspicious activity, for example, a weapon is no longer detected, the object is no longer speeding, or the like, the method 300 ends at step 328. Alternatively, in response to the second controller 221 determining that the object 114 is still exhibiting the suspicious activity, the method 300 proceeds to step 330 in which the secondary vehicle 104 processes the object data to determine a moving path of the object 114.

At step 330, the secondary vehicle 104 determines the moving path, and in some embodiments the speed, of the object 114, in the same manner as that performed by the primary vehicle 102 at step 308. It should be appreciated that the moving path of the object 114 determined by the secondary vehicle 104 may be the same as the moving path P determined by the primary vehicle 102. However, in instances in which the object 114 changes direction, the secondary vehicle 104 may determine a new moving path of the object 114.

Thereafter, at step 332, the secondary vehicle 104 broadcasts the signal including the object data of the object 114, which includes the new moving path of the object 114. The method 300 then returns to step 312 to determine whether the secondary vehicle 104 should broadcast the signal generally to other secondary vehicles or to the server 110. It should be appreciated that by permitting the secondary vehicle 104 to broadcast the signal similar to the primary vehicle 102, continued monitoring of the object 114 may be permitted for a longer duration of time than would be provided by only the primary vehicle 102 and the secondary vehicle 104, and cover a greater distance from the primary vehicle 102.

In some embodiments, in response to the determination being made at step 312 to transmit the signal directly to the server 110, the method 300 proceeds to step 334 in which the controller 241 of the server 110 processes the object data, which includes the moving path P and the speed of the object 114. The server 110 is configured to identify one or more secondary vehicles that are proximate the moving path P of the object 114 and transmit the signal directly to the one or more secondary vehicles. In some embodiments, the server 110 considers the speed of the object 114 included in the object data received from the primary vehicle 102 and determines one or more secondary vehicles that will be proximate the moving path P of the object 114 at some future time. Thus, it should be appreciated that the one or more secondary vehicles may not currently be proximate the moving path P of the object 114, but moving in a direction toward the moving path P and will approach the moving path P at the same or similar time as the object 114.

At step 336, the server 110 transmits the signal, including the object data, to the secondary vehicles that are, or will be, proximate the moving path P of the object 114. This allows for secondary vehicles to receive the signal that would otherwise be out of range from the primary vehicle 102 and not able to receive the signal.

From the above, it is to be appreciated that defined herein are collaborative security camera systems and methods for capturing image data of an object constituting suspicious activity by multiple vehicles positioned proximate a moving path of the object. As such, image data and/or sound data of an object constituting suspicious activity may be captured over a greater length of time and distance by the primary vehicle and one or more secondary vehicles as opposed to the data captured by the primary vehicle alone.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A collaborative security camera system comprising:
a primary vehicle comprising:
one or more sensors configured to obtain object data related to an object; and
a first controller configured to:
classify the object as suspicious activity or non-suspicious activity based on the obtained object data related to the object;
determine a moving path of the object based on the obtained object data related to the object in response to the object being classified as suspicious activity; and
broadcast a signal including the moving path of the object in response to the object being classified as suspicious activity; and
a plurality of secondary vehicles, each secondary vehicle comprising:
one or more sensors configured to obtain image data related to the object; and
a second controller configured to:
receive the broadcasted signal;
determine if the secondary vehicle is within the moving path of the object;
capture image data of the object in response to a determination that the secondary vehicle is proximate the moving path of the object; and
transmit image data of the object captured by the secondary vehicle to a server,
wherein the server is configured to receive the image data from each of the secondary vehicles, compile the image data into a single video file, and transmit the video file to the primary vehicle.

2. The collaborative security camera system of claim 1, wherein the first controller broadcasts the signal to the server.

3. The collaborative security camera system of claim 2, wherein the second controller receives the signal from the server.

4. The collaborative security camera system of claim 2, wherein the server is configured to:
identify a future location of the object based on the moving path and a speed of the object; and
transmit the signal to the secondary vehicle which will be proximate to the future location at the same time as the object.

5. The collaborative security camera system of claim 1, wherein:
the second controller is configured to transmit the image data captured by the secondary vehicle to the server; and
the server is configured to receive the image data and transmit the image data to the primary vehicle.

6. The collaborative security camera system of claim 1, wherein the second controller is configured to ignore the signal in response to a determination that the secondary vehicle is not proximate the moving path of the object.

7. The collaborative security camera system of claim 1, wherein the first controller is configured to determine a moving speed of the object based on the obtained object data related to the object.

8. The collaborative security camera system of claim 1, wherein the primary vehicle comprises a machine learning algorithm for classifying the object as suspicious activity.

9. The collaborative security camera system of claim 8, wherein the object is a person holding a weapon.

10. The collaborative security camera system of claim 8, wherein the object is a vehicle exhibiting an erratic driving behavior.

11. The collaborative security camera system of claim 1, wherein the object data related to the object includes at least one of image data of the object or sound data of the object.

12. A method for capturing object data of an object, the method comprising:
classifying an object as suspicious activity based on obtained object data related to the object by a first controller of a primary vehicle;
determining a moving path of the object based on the obtained object data related to the object;
broadcasting a signal from the first controller including the moving path of the object;
receiving the broadcasted signal at a second controller of a plurality of secondary vehicles;
determining if the plurality of secondary vehicles are within the moving path of the object;
capturing image data of the object by the second controller in response to a determination that the plurality of secondary vehicles are proximate the moving path of the object;
transmitting image data of the object captured by the plurality of secondary vehicles to a server;
compiling, at the server, the image data into a single video file; and
transmitting the video file from the server to the primary vehicle.

13. The method of claim 12, wherein the first controller broadcasts the signal to the server.

14. The method of claim 13, wherein the second controller receives the signal from the server.

15. The method of claim 13, further comprising:
identifying a future location of the object by the server based on the moving path and a speed of the object; and
transmitting the signal from the server to the secondary vehicle which will be proximate to the future location at the same time as the object.

16. The method of claim 12, further comprising:
transmitting the image data from the server to the primary vehicle.

17. The method of claim 12, further comprising ignoring the signal in response to a determination that the secondary vehicle is not proximate the moving path of the object.

18. The method of claim 12, further comprising determining a moving speed of the object based on the obtained object data related to the object by the first controller.

* * * * *